(12) United States Patent
Han et al.

(10) Patent No.: US 10,705,576 B2
(45) Date of Patent: *Jul. 7, 2020

(54) ELECTRONIC DEVICE INCLUDING DISPLAY AND SENSOR

(71) Applicant: Samsung Electronics Co., Ltd., Suwon-si, Gyeonggi-do (KR)

(72) Inventors: Seon-Ho Han, Suwon-si (KR); Seung-Hyun Park, Seoul (KR); Jun-Hui Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,312

(22) Filed: Feb. 25, 2019

(65) Prior Publication Data

US 2019/0187760 A1    Jun. 20, 2019

Related U.S. Application Data

(63) Continuation of application No. 15/234,781, filed on Aug. 11, 2016, now Pat. No. 10,261,549.

(30) Foreign Application Priority Data

Aug. 13, 2015 (KR) .................. 10-2015-0114966

(51) Int. Cl.
G06F 1/16 (2006.01)
G09G 5/10 (2006.01)
(Continued)

(52) U.S. Cl.
CPC ........ G06F 1/1684 (2013.01); G02F 1/13318 (2013.01); G06F 1/163 (2013.01); G06F 1/1647 (2013.01); G09G 5/10 (2013.01);
G06F 3/14 (2013.01); G09G 2300/0426 (2013.01); G09G 2320/0626 (2013.01);
(Continued)

(58) Field of Classification Search
CPC ...... G06F 1/1684; G06F 1/163; G06F 1/1647; G06F 3/14; G02F 1/13318; G09G 5/10; G09G 2300/0426; G09G 2320/0626; G09G 2360/144; G09G 2370/022; G09G 2380/08

See application file for complete search history.

(56) References Cited

U.S. PATENT DOCUMENTS 8,319,764 B2    11/2012    Lee et al.
8,987,652 B2    3/2015    Zheng
(Continued)

*Primary Examiner* — Peter D McLoone
(74) *Attorney, Agent, or Firm* — Jefferson IP Law, LLP

(57) ABSTRACT

An electronic device is provided. The electronic device includes a housing including a first housing surface that faces a first side, a second housing surface that faces a second side, and a side surface that surrounds at least a portion of a space between the first housing surface and the second housing surface, a display arranged within the housing and including a first display surface including a display screen exposed through the first housing surface and a second display surface that faces the second side, a structure arranged between the second display surface and the second housing surface including a contact surface, the structure including a through-opening, and a sensor, at least a portion of which is arranged within the opening and which is arranged to detect at least a portion of light received from the outside of the housing after passing through the first housing surface and the display.

20 Claims, 13 Drawing Sheets

(51) Int. Cl.
  *G02F 1/133* (2006.01)
  *G06F 3/14* (2006.01)
(52) U.S. Cl.
  CPC . *G09G 2360/144* (2013.01); *G09G 2370/022* (2013.01); *G09G 2380/08* (2013.01)

(56) References Cited

U.S. PATENT DOCUMENTS

| | | |
|---|---|---|
| 9,041,698 B2 | 5/2015 | Lee et al. |
| 9,129,548 B2 | 9/2015 | Zheng |
| 9,310,843 B2 | 4/2016 | Shedletsky et al. |
| 9,367,087 B1 | 6/2016 | Townsend et al. |
| 9,373,307 B2 | 6/2016 | Kim et al. |
| 9,471,102 B2 | 10/2016 | Townsend et al. |
| 9,477,263 B2 | 10/2016 | Hotelling et al. |
| 9,602,641 B2 | 3/2017 | Kim et al. |
| 9,620,571 B2 | 4/2017 | Shedletsky et al. |
| 2010/0328283 A1 | 12/2010 | Lee et al. |
| 2013/0037704 A1 | 2/2013 | Lee et al. |
| 2013/0106813 A1 | 5/2013 | Hotteling et al. |
| 2013/0162526 A1 | 6/2013 | Kim et al. |
| 2014/0132578 A1 | 5/2014 | Zheng |
| 2014/0152632 A1 | 6/2014 | Shedletsky et al. |
| 2014/0166850 A1 | 6/2014 | Zheng |
| 2014/0183342 A1 | 7/2014 | Shedletsky et al. |
| 2015/0144934 A1 | 5/2015 | Rappoport et al. |
| 2015/0358438 A1 | 12/2015 | Kim et al. |
| 2016/0062392 A1 | 3/2016 | Townsend et al. |
| 2016/0218156 A1 | 6/2016 | Shedletsky et al. |
| 2016/0324470 A1 | 11/2016 | Townsend et al. |
| 2017/0083045 A1 | 3/2017 | Shim et al. |
| 2017/0164278 A1 | 6/2017 | Fang |
| 2017/0214004 A1 | 7/2017 | Shedletsky et al. |

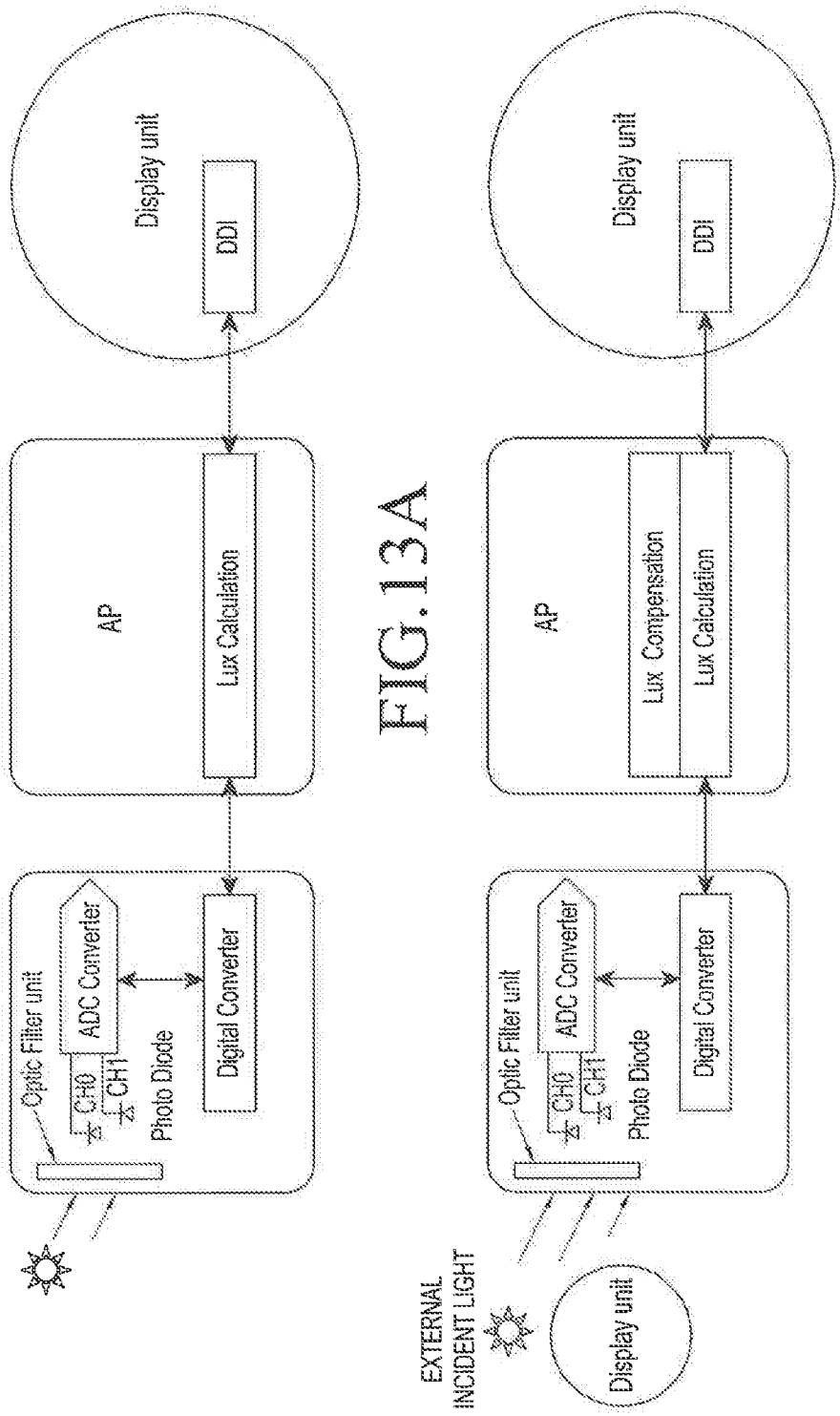

ELECTRONIC DEVICE INCLUDING DISPLAY AND SENSOR

CROSS-REFERENCE TO RELATED APPLICATION(S)

This application is a continuation application of prior application Ser. No. 15/234,781, filed on Aug. 11, 2016, and was based on and claimed priority under 35 U.S.C. § 119(a) of a Korean patent application filed on Aug. 13, 2015 in the Korean Intellectual Property Office and assigned Serial number 10-2015-0114966, the entire disclosure of which is hereby incorporated by reference.

TECHNICAL FIELD

The present disclosure relates to an electronic device. More particularly, the present disclosure relates to an electronic device including a display and a sensor, in which the sensor is provided in the display.

BACKGROUND

Service contents and terminals have been developed amazingly since the introduction of portable terminals. The services that supported only voice communications in the past have developed to Internet and broadcasting services including services, such as transmission of short text messages and photos, camera functions and Moving Picture Experts Group phase 1 or phase 2 (MPEG-1 or MPEG-2) audio layer-3 (MP3) functions have been added to the simple voice communication functions, and the screens of the terminals also have developed from black and white screens to high-quality liquid crystal display (LCD) screens. The communication services also have become multifunctional so that more than six services are currently used as compared with two or three services of the past in one band. Currently, display devices having touch functions on almost the entire front surface of the terminal have been implemented by bar type terminals. As the size of the display devices gradually gets larger, current consumption is also gradually increasing, and the terminal manufacturers are competing to reduce power consumption. As a measure for reducing current consumption, the brightness of a display device or a keypad assembly is automatically adjusted according to an illumination intensity of an external environment, by installing an illumination intensity sensor around a front panel. That is, the display screen becomes brighter in a bright environment, and becomes darker in a dark place so that a power source may be efficiently used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide the illumination intensity sensor is installed within a terminal, and may be mounted on a front panel, for example, a periphery of the display device, and in detail, at a predetermined location of an upper side of the front panel. The light receiving part of the illumination intensity sensor is implemented by a transparent window so that the brightness of peripheral light may be measured and a corresponding application may be performed according to the measured illumination intensity value.

Another aspect of the present disclosure is to provide the illumination intensity sensor may be mounted at a predetermined location of the periphery of the front panel to receive peripheral light.

Another aspect of the present disclosure is to provide the illumination intensity sensor may be mounted at a peripheral circumference of the display device, for example, in a non-active area (NAA) (for example, a shield area) around an active area in which a screen is displayed, and accordingly, the design of the electronic device may be restricted and it may be necessary to consider a location of the illumination intensity sensor when the components of the electronic device are designed. For example, in general, as the illumination intensity sensor is mounted adjacent to a speaker or a front camera and a front light-emitting diode (LED), the mounting locations of the components should be considered, and the design may be restricted by interference with other components. As a front transparent window is arranged in the illumination intensity sensor to receive external light, an aesthetic feeling in design may be hindered because an unshielded part is generated in the entire shield area.

In addition, in recent electronic devices, the size of the shield area has become very narrow by reducing the shield area or mounting the shield area inside the housing, and the mounting space of the illumination intensity sensor cannot be sufficiently secured because wearable electronic devices such as watch type electronic devices have a very narrow shield area.

Various embodiments of the present disclosure provide an electronic device in which an illumination intensity sensor that is mounted at an outer periphery of an active area of a display unit according to the related art may be mounted in an active area of a display unit.

In accordance with an aspect of the present disclosure, an electronic device is provided. The electronic device includes a housing comprising a first housing surface that faces a first side, a second housing surface that faces a second side opposite to the first side, and a side surface that surrounds at least a portion of a space between the first surface and the second surface, a display unit arranged within the housing and including a first display surface including a display screen exposed through the first housing surface and a second display surface that faces the second side, a structure arranged between the second display surface and the second housing surface and including a contact surface at a corresponding part of the second display surface, the structure including a through-opening which is viewed as an opening when viewed from an upper side of the first housing surface, and a sensor, at least a portion of which is arranged within the opening and which is arranged to detect at least a portion of light received from the outside of the housing after passing through the first housing surface and the display unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 13A and 13B are schematic views illustrating a driving process of an illumination intensity sensor member, in an electronic device according to various embodiments of the present disclosure.

Throughout the drawings, like reference numerals will be understood to refer to like parts, components, and structures.

DETAILED DESCRIPTION

Figure 1:
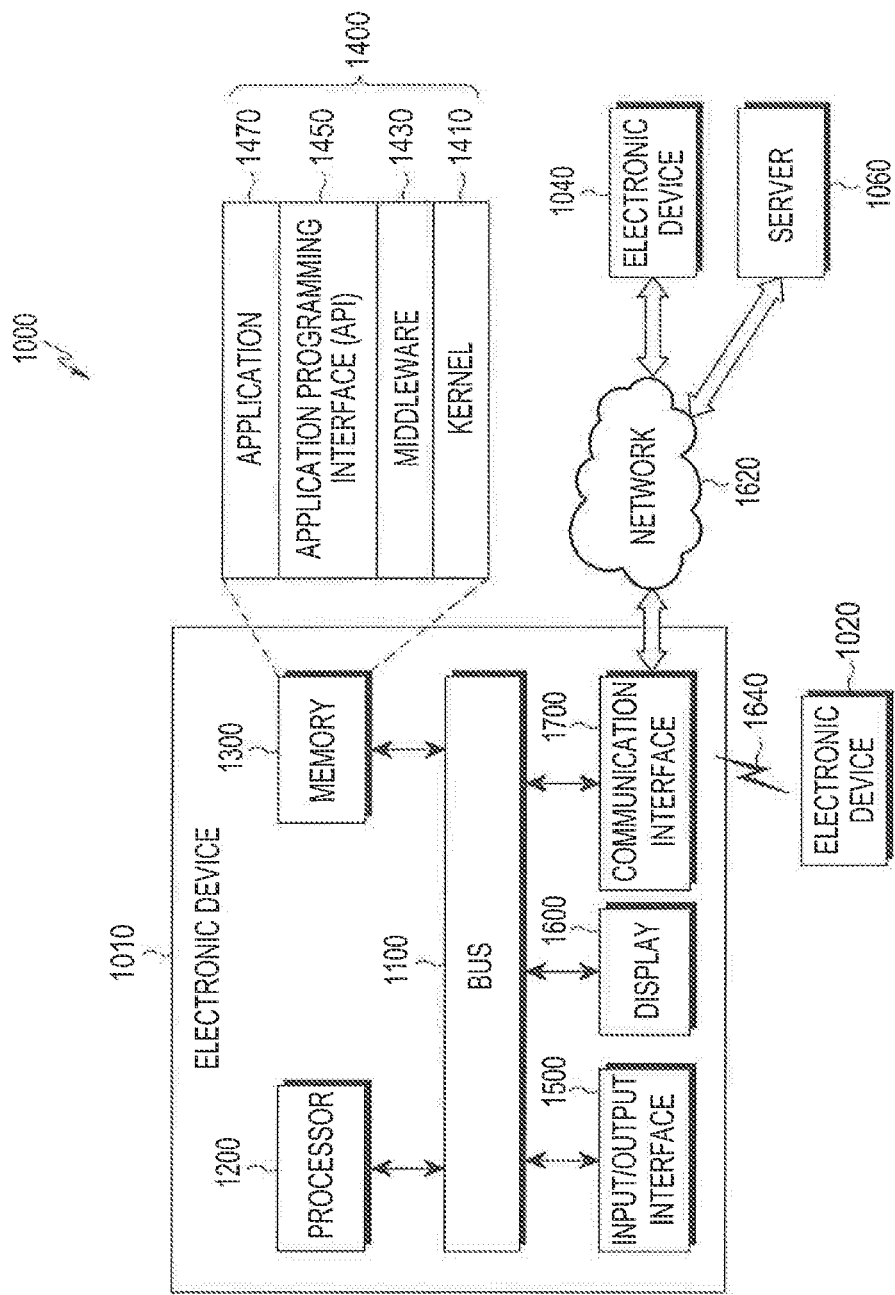
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor)

only for performing the corresponding operations or a generic-purpose processor (e.g., central processing unit (CPU) or application processor (AP)) that may perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude various embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, and the like).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology An electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates an electronic device in a network environment according to various embodiments of the present disclosure.

Referring to FIG. 1, an electronic device 1010 within a network environment 1000, according to various embodiments, will be described. The electronic device 1010 may include a bus 1100, a processor 1200, a memory 1300, an input/output interface 1500, a display 1600, and a communication interface 1700. In some embodiments, the electronic device 1010 may omit at least one of the above elements or may further include other elements.

The bus 1100 may include, for example, a circuit for connecting the elements 1200, 1300 and 1500 to 1700 and transferring communication (e.g., control messages and/or data) between the elements.

The processor 1200 may include one or more of a CPU, an AP, and a communication processor (CP). The processor 1200, for example, may carry out operations or data processing relating to control and/or communication of at least one other element of the electronic device 1010. The processor 1200 may be referred to as a controller, may include the controller as a part thereof, or may constitute the controller.

The memory 1300 may include a volatile memory and/or a non-volatile memory. The memory 1300 may store, for example, instructions or data relevant to at least one other element of the electronic device 1010. According to an embodiment, the memory 1300 may store software and/or a program 1400. The program 1400 may include, for example, a kernel 1410, middleware 1430, an application programming interface (API) 1450, and/or application programs (or "applications") 1470. At least some of the kernel 1410, the middleware 1430, and the API 1450 may be referred to as an operating system (OS).

The kernel 1410 may control or manage system resources (e.g., the bus 1100, the processor 1200, or the memory 1300) used for performing an operation or function implemented by the other programs (e.g., the middleware 1430, the API 1450, or the application programs 1470). Furthermore, the kernel 1410 may provide an interface through which the middleware 1430, the API 1450, or the application programs 1470 may access the individual elements of the electronic device 1010 to control or manage the system resources.

The middleware 1430, for example, may function as an intermediary for allowing the API 1450 or the application programs 1470 to communicate with the kernel 1410 to exchange data.

In addition, the middleware 1430 may process one or more task requests received from the application programs 1470 according to priorities thereof. For example, the middleware 1430 may assign priorities for using the system resources (e.g., the bus 1100, the processor 1200, the memory 1300, and the like) of the electronic device 1010, to at least one of the application programs 1470. For example, the middleware 1430 may perform scheduling or loading balancing on the one or more task requests by processing the one or more task requests according to the priorities assigned thereto.

The API 1450 is an interface through which the applications 1470 control functions provided from the kernel 1410 or the middleware 1430, and may include, for example, at least one interface or function (e.g., instruction) for file control, window control, image processing, or text control.

The input/output interface 1500, for example, may function as an interface that may transfer instructions or data input from a user or another external device to the other element(s) of the electronic device 1010. Also, the input/output interface 1500 may output, to the user or another external device, commands or data received from the element(s) other than the input/output interface 150 within the electronic device 1010.

Examples of the display 1600 may include a liquid crystal display (LCD), a light-emitting diode (LED) display, an organic LED (OLED) display, a microelectromechanical Systems (MEMS) display, and an electronic paper display. For example, the display 1600 may display various pieces of content (e.g., text, images, videos, icons, symbols, and the like) to the user. The display 1600 may include a touch screen and receive, for example, a touch, gesture, proximity, or hovering input using an electronic pen or the user's body part.

The communication interface 1700, for example, may set communication between the electronic device 1010 and an external device (e.g., a first external electronic device 1020, a second external electronic device 1040, or a server 1060). For example, the communication interface 1700 may be connected to a network 1620 through wireless or wired communication to communicate with the external device (e.g., the second external electronic device 1040 or the server 1060). The communication interface 1700 may include a CP, and the CP may form one of a plurality of modules constituting the communication interface 1700. In an embodiment of the present disclosure, the CP may also be included in the processor 1200.

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 1640. The short-range communication 1640 may be performed by using at least one of, for example, Wi-Fi, Bluetooth (BT), near field communication (NFC), and global navigation satellite system (GNSS). The GNSS may include at least one of, for example, a GPS, a global navigation satellite system (Glonass), a Beidou navigation satellite system (hereinafter referred to as "Beidou"), and a European global satellite-based navigation system (Galileo), according to a use area, a bandwidth, and the like. In the present disclosure, the "GPS" may be interchangeably used with the "GNSS". The wired communication may include at least one of, for example, a universal serial bus (USB), a high definition multimedia interface (HDMI), recommended standard 232 (RS-23200), and a plain old telephone service (POTS). The network 1620 may include at least one of a communication network such as a computer network (e.g., a local area network (LAN) or a wide area network (WAN)), the Internet, and a telephone network.

Each of the first and second external electronic devices 1020 and 1040 may be of a type identical to or different from that of the electronic device 1010. According to an embodiment of the present disclosure, the server 1060 may include a group of one or more servers. According to various embodiments of the present disclosure, all or some of the operations performed in the electronic device 1010 may be performed in another electronic device or a plurality of electronic devices (e.g., the first and second external electronic devices 1020 and 1040 or the server 1060). According to an embodiment, when the electronic device 1010 has to perform some functions or services automatically or in response to a request, the electronic device 1010 may make a request for performing at least some functions relating thereto to another device (e.g., the first and second external electronic devices 1020 or 1040 or the server 1060) instead of performing the functions or services by itself or in addition. The other electronic device (e.g., the first and second external electronic devices 1020 or 1040 or the server 1060) may carry out the requested functions or the additional functions and transfer the result to the electronic device 1010. The electronic device 1010 may process the received result as it is or additionally to provide the requested functions or services. To achieve this, for example, cloud computing, distributed computing, or client-server computing technology may be used.

Figure 2:
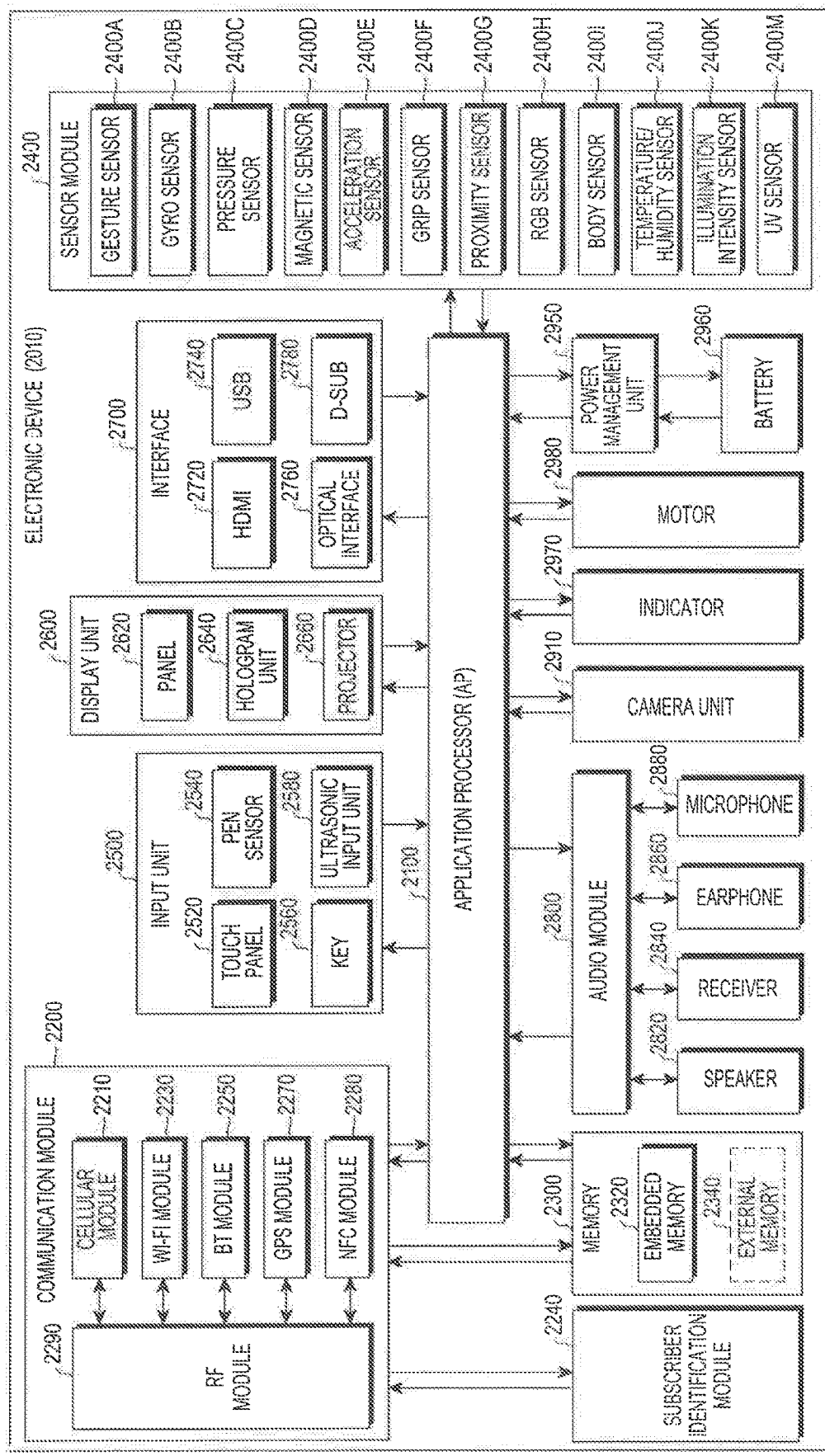
FIG. 2 is a block diagram of an electronic device according to various embodiments of the present disclosure.

FIG. 2 is a block diagram of an electronic device according to various embodiments of the present disclosure.

Referring to FIG. 2, an electronic apparatus 2010 may include the whole or part of the electronic device 1010 illustrated in FIG. 1. The electronic device 2010 may include at least one processor (e.g., AP) 2100, a communication module 2200, a memory 2300, a sensor module 2400, an input device 2500, and a display 2600 and may further include at least one of a subscriber identification module (SIM) 2240, an interface 2700, an audio module 2800, a camera module 2910, a power management module 2950, a battery 2960, and indicator 2970, and a motor 2980.

The processor 2100 may control a plurality of hardware or software components connected to the processor 2100 by driving an OS or an application program and perform processing of various pieces of data and calculations. The processor 2100 may be implemented by, for example, a system on chip (SoC). According to an embodiment of the present disclosure, the processor 2100 may further include a graphics processing unit (GPU) and/or an image signal processor. The processor 2100 may include at least some (e.g., a cellular module 2210) of the elements illustrated in FIG. 2. The processor 2100 may load, into a volatile memory, instructions or data received from at least one (e.g., a non-volatile memory) of the other elements and may process the loaded instructions or data, and may store various data in a non-volatile memory.

The communication module 2200 may have a configuration equal or similar to that of the communication interface 1700 of FIG. 1. The communication module 2200 may include, for example, the cellular module 2210, a Wi-Fi module 2230, a BT module 2250, a GNSS module 2270 (e.g., a GPS module, a Glonass module, a Beidou module, or a Galileo module), an NFC module 2280, and a radio frequency (RF) module 2290.

The cellular module 2210 may provide a voice call, image call, a text message service, or an Internet service through, for example, a communication network. According to an embodiment, the cellular module 2210 may distinguish between and authenticate electronic devices 2010 within a communication network using a SIM (e.g., the SIM card 2240). According to an embodiment of the present disclosure, the cellular module 2210 may perform at least some of the functions that the processor 2100 may provide. According to an embodiment, the cellular module 2210 may include a CP.

Each of the Wi-Fi module 2230, the BT module 2250, the GNSS module 2270, and the NFC module 2280 may include, for example, a processor for processing data transmitted and received through the relevant module. According to some embodiments of the present disclosure, at least some (e.g., two or more) of the cellular module 2210, the Wi-Fi module 2230, the BT module 2250, the GNSS module 2270, and the NFC module 2280 may be included in one integrated chip (IC) or IC package.

The RF module 2290 may transmit/receive, for example, a communication signal (e.g., an RF signal). The RF module 2290 may include, for example, a transceiver, a power amp module (PAM), a frequency filter, a low noise amplifier (LNA), or an antenna. According to another embodiment of the present disclosure, at least one of the cellular module 2210, the Wi-Fi module 2230, the BT module 2250, the GNSS module 2270, and the NFC module 2280 may transmit and receive RF signals through a separate RF module.

The SIM 2240 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 2300 (e.g., the memory 1300) may include, for example, an internal memory 2320 or an external memory 2340. The embedded memory 2320 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 2340 may further include a flash drive, for example, a compact flash (CF), a secure digital (SD), a micro-SD, a mini-SD, an eXtreme digital (xD), a memory stick, and the like. The external memory 2340 may be functionally and/or physically connected to the electronic device 2010 through various interfaces.

The sensor module 2400 may measure a physical quantity or detect an operation state of the electronic device 2010, and may convert the measured or detected information into an electrical signal. The sensor module 2400 may include, for example, at least one of a gesture sensor 2400A, a gyro sensor 2400B, an atmospheric pressure sensor 2400C, a magnetic sensor 2400D, an acceleration sensor 2400E, a grip sensor 2400F, a proximity sensor 2400G, a color sensor 2400H (e.g., a red, green, blue (RGB) sensor), a biometric sensor 2400I, a temperature/humidity sensor 2400J, a light sensor 2400K, and a ultraviolet (UV) sensor 2400M. Additionally or alternatively, the sensor module 2400 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2400 may further include a control circuit for controlling one or more sensors included therein. In some embodiments of the present disclosure, the electronic apparatus 2010 may further include a processor configured to control the sensor module 2400 as a part of or separately from the processor 2100, and may control the sensor module 2400 while the processor 2100 is in a sleep state.

The input device 2500 may include, for example, a touch panel 2520, a (digital) pen sensor 2540, a key 2560, or an ultrasonic input device 2580. The touch panel 2520 may use at least one of, for example, a capacitive type, a resistive type, an infrared type, and an ultrasonic type. Also, the touch panel 2520 may further include a control circuit. The touch panel 2520 may further include a tactile layer and provide a tactile reaction to the user.

The (digital) pen sensor 2540 may include, for example, a recognition sheet which is a part of the touch panel or is separated from the touch panel. The key 2560 may include, for example, a physical button, an optical key or a keypad. The ultrasonic input device 2580 may detect ultrasonic wavers generated by an input tool through a microphone (e.g., a microphone 2880) and identify data corresponding to the detected ultrasonic waves.

The display 2600 (e.g., the display 1600) may include a panel 2620, a hologram device 2640, and/or a projector 2660. The panel 2620 may include a configuration identical or similar to that of the display 1600 illustrated in FIG. 1. The panel 2620 may be implemented to be, for example, flexible, transparent, or wearable. The panel 2620 and the touch panel 2520 may be implemented as one module. The hologram 2640 may show a three dimensional image in the air by using an interference of light. The projector 2660 may display an image by projecting light onto a screen. The screen may be located, for example, inside or outside the electronic apparatus 2010. According to an embodiment, the display 2600 may further include a control circuit for controlling the panel 2620, the hologram device 2640, or the projector 2660.

The interface 2700 may include, for example, HDMI 2720, a USB 2740, an optical interface 2760, or a D-sub-miniature (D-sub) 2780. The interface 2700 may be included in, for example, the communication interface 1700 illustrated in FIG. 1. Additionally or alternatively, the interface 2700 may include, for example, a mobile high-definition link (MHL) interface, a SD card/multi-media card (MMC) interface, or an infrared data association (IrDA) standard interface.

The audio module 2800 may bilaterally convert, for example, a sound and an electrical signal. At least some elements of the audio module 2800 may be included in, for example, the input/output interface 1500 illustrated in FIG. 1. The audio module 2800 may process sound information which is input or output through, for example, a speaker 2820, a receiver 2840, earphones 2860, the microphone 2880 and the like.

The camera module 2910 is a device which may photograph a still image and a dynamic image. According to an embodiment, the camera module 2910 may include one or more image sensors (e.g., a front sensor or a back sensor), a lens, an image signal processor (ISP) or a flash (e.g., LED or xenon lamp).

The power management module 2950 may manage, for example, power of the electronic device 2010. According to an embodiment of the present disclosure, the power management module 2950 may include a power management integrated circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, and the like) for wireless charging may be further included. The battery gauge may measure, for example, a residual quantity of the battery 2960, and a voltage, a current, or a temperature during the charging. The battery 2960 may include, for example, a rechargeable battery or a solar battery.

The indicator 2970 may display a particular state (e.g., a booting state, a message state, a charging state, and the like) of the electronic device 2010 or a part (e.g., the processor 2100) of the electronic device 1010. The motor 2980 may convert an electrical signal into mechanical vibration, and may generate vibration, a haptic effect, and the like. Although not illustrated, the electronic apparatus 2010 may include a processing unit (e.g., a GPU) for supporting a mobile TV. The processing unit for supporting mobile TV may, for example, process media data according to a certain standard such as digital multimedia broadcasting (DMB), digital video broadcasting (DVB), or media FLOTM.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
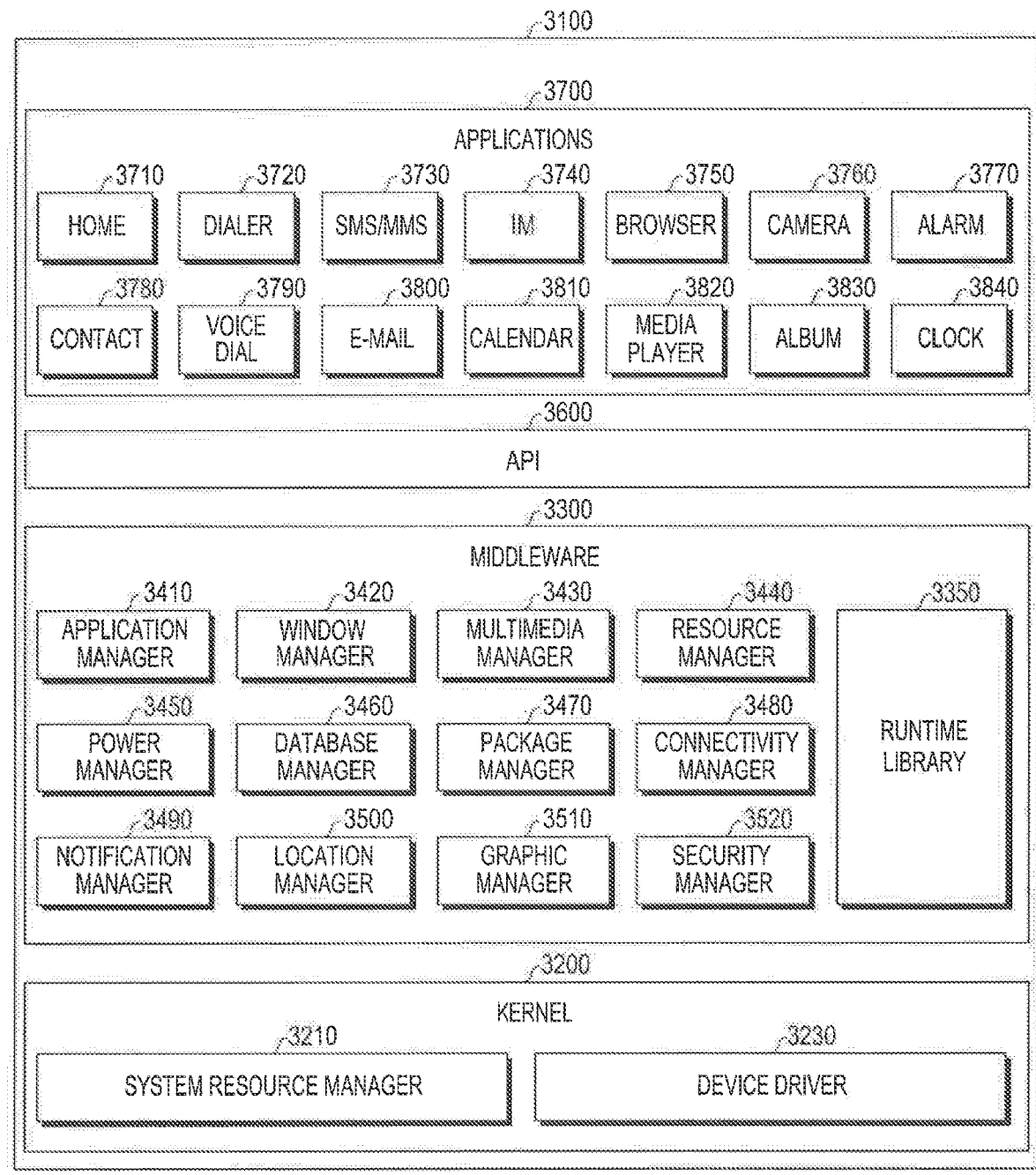
FIG. 3 is a block diagram of a program module according to various embodiments.

FIG. 3 is a block diagram of a program module according to various embodiments of the present disclosure.

Referring to FIG. 3, a program module 3100 (e.g., the program 1400) may include an OS for controlling resources related to the electronic device (e.g., the electronic device 1010) and/or various applications (e.g., the application programs 1470) executed in the operating system. The OS may be, for example, Android, iOS, Windows, Symbian, Tizen, Bada, and the like.

The program module 3100 may include a kernel 3200, middleware 3330, an API 360, and/or an application 3700. At least some of the program module 3100 may be preloaded on the electronic apparatus, or may be downloaded from an external electronic apparatus (e.g., the first or second external electronic device 1020 or 1040, or the server 1060).

The kernel 3200 (e.g., the kernel 1410) may include, for example, a system resource manager 3210 and/or a device driver 3230. The system resource manager 3210 may perform the control, allocation, retrieval, and the like of system resources. According to an embodiment of the present disclosure, the system resource manager 3210 may include a process manager, a memory manager, a file system manager, and the like. The device driver 3230 may include, for example, a display driver, a camera driver, a BT driver, a shared memory driver, a USB driver, a keypad driver, a Wi-Fi driver, an audio driver, or an inter-process communication (IPC) driver.

The middleware 3330 may provide a function required by the applications 3700 in common or provide various functions to the applications 3700 through the API 3600 so that the applications 3700 may efficiently use limited system resources within the electronic device.

According to an embodiment of the present disclosure, the middleware 3330 (e.g., the middleware 1430) may include at least one of a runtime library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, and a security manager 3520.

The runtime library 3350 may include a library module that a compiler uses in order to add a new function through a programming language while the applications 3700 are being executed. The runtime library 3350 may perform input/output management, memory management, the functionality for an arithmetic function, and the like.

The application manager 3410 may manage, for example, the life cycle of at least one of the applications 3700. The window manager 3420 may manage graphical user interface (GUI) resources used for the screen. The multimedia manager 3430 may determine a format required to reproduce various media files, and may encode or decode a media file by using a coder/decoder (codec) appropriate for the relevant format. The resource manager 3440 may manage resources, such as a source code, a memory, a storage space, and the like of at least one of the applications 3700.

The power manager 3450 may operate together with a basic input/output system (BIOS) to manage a battery or power and may provide power information required for the operation of the electronic device. The database manager 3460 may generate, search for, and/or change a database to be used by at least one of the applications 3700. The package manager 3470 may manage the installation or update of an application distributed in the form of a package file.

The connectivity manager 3480 may manage a wireless connection such as, for example, Wi-Fi or BT. The notification manager 3490 may display or notify of an event, such as an arrival message, an appointment, a proximity notification, and the like, in such a manner as not to disturb the user. The location manager 3500 may manage location information of the electronic apparatus. The graphic manager 3510 may manage a graphic effect, which is to be provided to the user, or a user interface related to the graphic effect. The security manager 3520 may provide various security functions required for system security, user authentication, and the like.

According to an embodiment of the present disclosure, when the electronic apparatus (e.g., the electronic device 1010) has a telephone call function, the middleware 3330 may further include a telephony manager for managing a voice call function or a video call function of the electronic apparatus.

The middleware 3330 may include a middleware module that forms a combination of various functions of the above-described elements. The middleware 3330 may provide a module specialized for each type of OS in order to provide a differentiated function. Also, the middleware 3330 may dynamically delete some of the existing elements, or may add new elements.

The API 360 (e.g., the API 1450) is, for example, a set of API programming functions, and may be provided with a different configuration according to an OS. For example, in the case of Android or iOS, one API set may be provided for each platform. In the case of Tizen, two or more API sets may be provided for each platform.

The applications 3700 (e.g., the application programs 1470) may include one or more applications capable of performing functions, such as, for example, a home 3710, a dialer 3720, a short message service (SMS)/multimedia messaging service (MMS) 3730, an instant message (IM) 3740, a browser 3750, a camera 3760, an alarm 3770, a contact 3780, a voice dialer 3790, an email 3800, a calendar 3810, a media player 3820, an album 3830, a clock 3840, a health care application (e.g., which measures an exercise quantity, a blood sugar level, and the like), and providing of environmental information (e.g., information on atmospheric pressure, humidity, temperature, and the like).

According to an embodiment of the present disclosure, the applications 3700 may include an application (i.e., referred to as an "information exchange application" for convenience of description) supporting information exchange between the electronic apparatus (e.g., the electronic device 1010) and an external electronic apparatus (e.g., the first or second external electronic devices 1020 or 1040). The application associated with information exchange may include, for example, a notification relay application for forwarding specific information to an external electronic device, or a device management application for managing an external electronic device.

For example, the notification relay application may include a function of delivering, to the external electronic apparatus (e.g., the first or second external electronic device 1020 or 1040), notification information generated by other applications (e.g., an SMS/MMS application, an email application, a health care application, an environmental information application, and the like) of the electronic apparatus 101. Further, the notification relay application may receive notification information from, for example, an external electronic device and provide the received notification information to a user.

The device management application may manage (e.g., install, delete, or update), for example, a function for at least a part of the external electronic device (e.g., the electronic device 1040) communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

According to an embodiment of the present disclosure, the applications 3700 may include applications (e.g., a health care application of a mobile medical appliance and the like) designated according to attributes of the first and second external electronic devices 1020 or 1040. According to an embodiment of the present disclosure, the application 3700 may include an application received from the external electronic apparatus (e.g., the server 1060, or the first or second external electronic device 1020 or 1040).

According to an embodiment of the present disclosure, the application 3700 may include a preloaded application or a third party application which may be downloaded from the server. Names of the elements of the program module 3100, according to the above-described embodiments of the present disclosure, may change depending on the type of OS.

According to various embodiments of the present disclosure, at least some of the program module 3100 may be implemented in software, firmware, hardware, or a combination of two or more thereof. At least some of the program module 3100 may be implemented (e.g., executed) by, for example, the processor (e.g., the processor 1410). At least some of the program module 3100 may include, for example, a module, a program, a routine, a set of instructions, and/or a process for performing one or more functions.

Figure 4:
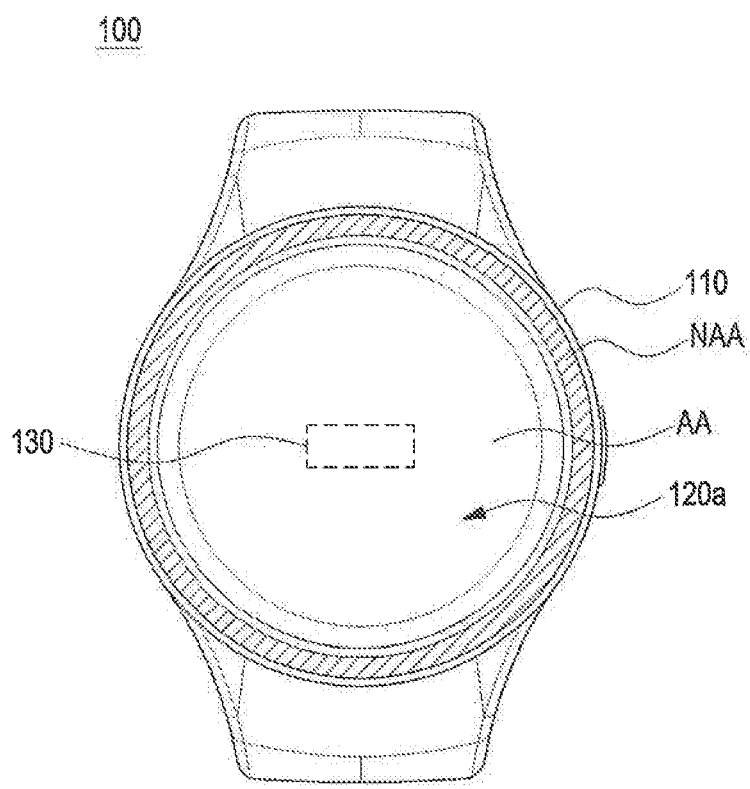
FIG. 4 is a schematic sectional view of an electronic device according to various embodiments of the present disclosure.

FIG. 4 is a schematic sectional view of an electronic device according to various embodiments of the present disclosure.

Referring to FIG. 4, the electronic device 100 according to the present disclosure may include a housing 110, a display unit 120a, and a structure (hereinafter, referred to as "a lower panel 120b") including a through-opening, and an illumination intensity sensor member 130.

According to various embodiments of the present disclosure, the housing 110 may include a first surface (ex. upper surface) that faces a first side, a second surface (ex. bottom surface) that faces a second side opposite to the first side, and a side surface that surrounds at least a portion of a space between the first surface and the second surface.

According to various embodiments of the present disclosure, the display unit 120a is positioned on one surface of the housing 110, for example, the first surface, and various internal components may be mounted within the housing 110.

According to various embodiments of the present disclosure, the display unit 120a is a unit arranged within the housing 110, and may include a first surface (ex. upper surface) including a display screen exposed through the first surface of the housing 110 and a second surface (ex. bottom surface) that faces a second side. The display unit 120a may be divided into an active area AA in which a screen is displayed and a non-active area (NAA) provided around the active area AA. For example, the active area AA is an area in which a screen may be displayed through a display panel 126a and an input and an output may be implemented by the touch panel 123a and the NAA is an area located around the active area AA and in which signal lines or terminals of the touch panel 123a or the display panel are arranged and also is an area that is shielded by various colors or the housing 110 to restrain the signal lines or the terminals from being exposed to the outside.

According to various embodiments of the present disclosure, the illumination intensity sensor member 130 is arranged at a location of the display unit 120a, for example, in the active area AA of the display unit 120a, and may be arranged in a through-opening formed in the lower panel 120b arranged on a lower surface (i.e., referred to as a second surface) of the display unit 120a. The illumination intensity sensor 130 will be described below.

Figure 5:
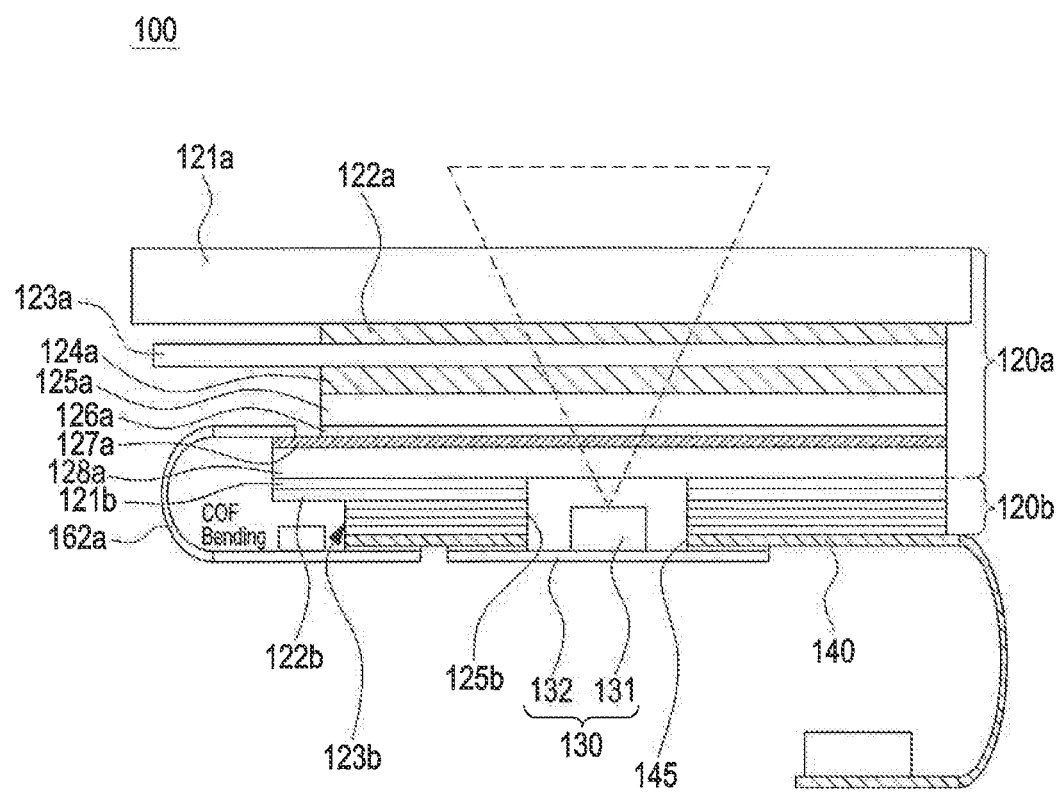
FIG. 5 is a view illustrating an electrical coupling state according to an embodiment of the present disclosure in addition to a stack state of an electronic device according to a first embodiment of the present disclosure, in an electronic device according to various embodiments of the present disclosure.

FIG. 5 is a view illustrating an electrical coupling state according to the embodiment of the present disclosure in addition to a stack state of an electronic device 100 according to a first embodiment of the present disclosure, in an electronic device 100 according to various embodiments of the present disclosure.

Figure 6A:
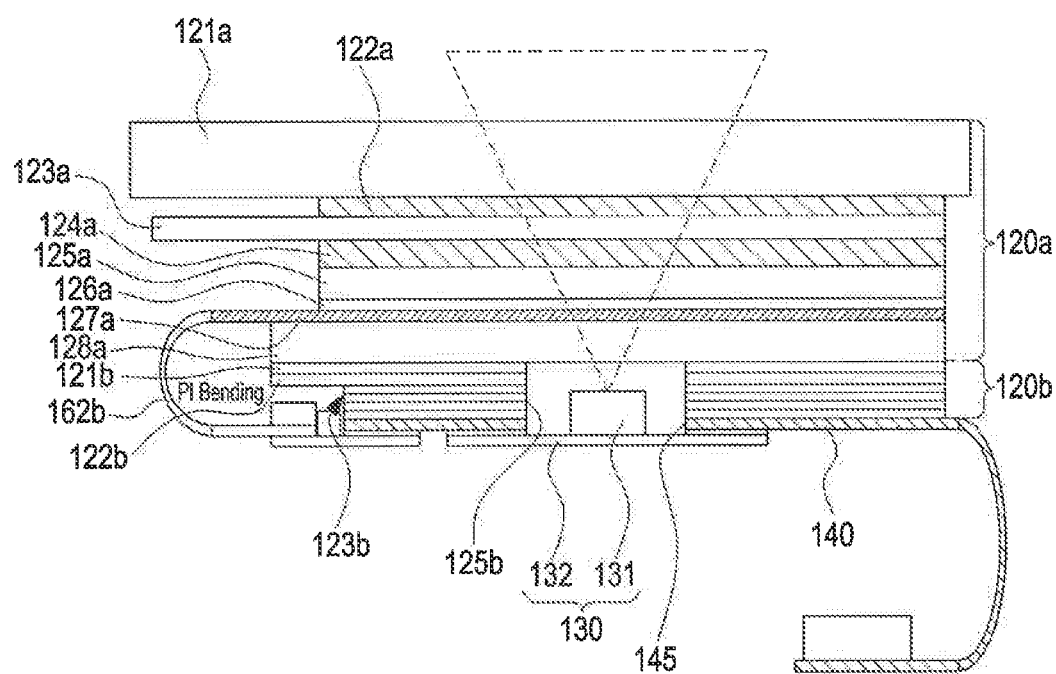
FIGS. 6A and 6B are views illustrating a stack state of an electronic device according to a first embodiment of the present disclosure in an electronic device according to various embodiments of the present disclosure and an electrical coupling state according to another embodiment of the present disclosure.
Figure 6B:
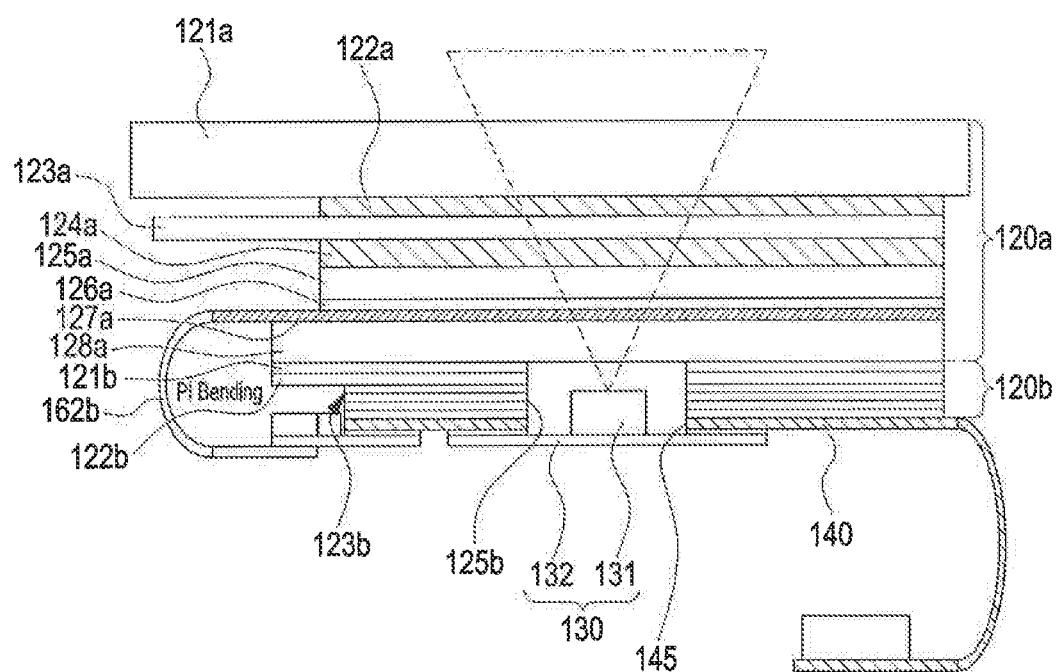

FIGS. 6A and 6B are views illustrating a stack state of an electronic device according to various embodiments of the present disclosure and an electrical coupling state according to another embodiment of the present disclosure.

Referring to FIG. 5, because the stack structures of the display unit 120a are the same but electrical connection structures for connecting the display unit 120a, which will be described below, to a first circuit board 140 are different in FIG. 5 and FIGS. 6A and 6B, a description of the stack structure of the display unit 120a will not be repeated and the different aspects thereof will be described.

Referring to FIGS. 5 and 6B, the lower panel 120b may be arranged between the second surface of the display unit 120a and a second surface of the housing 110, and a contact surface may be provided at the corresponding portion of the second surface of the display unit 120a. The lower panel 120b may include a through-opening (i.e., referred to as 'a first opening' or 'first and second openings'). The through-opening, which is viewed as an opening when viewed from the upper side of the housing 110, may be formed such that the illumination intensity sensor member 130 is arranged in the active area of the display unit 120a As mentioned above, according to various embodiments of the present disclosure, the display unit 120a may be exposed through the first surface of the housing 110.

According to various embodiments of the present disclosure, the display unit 120a may display a screen and implement an input. The display unit 120a according to the embodiment of the present disclosure may include a window panel 121a, adhesive layers 122a and 124a such as optically clear adhesive films (i.e., referred to as 'optically clear adhesive films'), a first conductive pattern (i.e., referred to as 'a touch panel 123a') that may implement an input according to an approach or a contact, an OLED layer including a polarization panel 125a and a display panel 126a, and first and second polymer layers 127a and 128a.

According to various embodiments of the present disclosure, the window panel 121a is installed on a front-most surface of the display unit 120a and may be formed of transparent glass to protect the display unit 120a.

According to various embodiments of the present disclosure, the touch panel 123a may be arranged between the OLED layer, which will be described below, and the first surface of the display unit 120a. The touch panel 123a is a configured to implement an input according to a contact or an approach of the active area AA. According to various embodiments of the present disclosure, the touch panel 123a may be implemented in various types such as a capacitive touch panel 123a or an electromagnetically resonant touch panel 123a, a resistive touch panel 123a, an infrared touch panel 123a, an electronic magnetic resonance (EMR) type touch panel 123a and an acoustic wave type touch panel 123a, or through a combination thereof. The touch panel 123a may be arranged between an upper surface of the above-described display unit 120a, in detail, the window panel 121a and the display panel 126a.

According to various embodiments of the present disclosure, the optically clear adhesive films 122a and 124a may be provided to couple the window panel 121a and the touch panel 123a, and the touch panel 123a and the polarization panel 125a, which will be described below. The optically clear adhesive films 122a and 124a may be provided to couple the touch panel 123a and the polarization panel 125a, which will be described below, and transmit electrical signals between the polarization panel 125a, and the second polymer layer 127a such as a polyimide layer 127a and the touch panel 123a.

According to various embodiments of the present disclosure, the first polymer layer 128a may form the second surface of the display unit 120a. The first polymer layer 128a may be provided on a lower surface of the second polymer layer 127a, and when the second polymer layer 127a is thin, a transparent support polymer panel (polyethylene terephthalate: PET) may be provided to support and reinforce the second polymer layer 127a.

Accordingly to various embodiments of the present disclosure, the second polymer layer 127a may be a polyimide film and is configured to supply electric power to the display panel 126a, and may be electrically coupled to a flexible printed circuit board (i.e., referred to as 'a first circuit board 140'), which will be described below, and may be connected to a main circuit board mounted to the interior of the housing 110.

The second polymer layer 127a may further include a part 162a, 162b extending from a part arranged between the first polymer layer 128a and the first surface of the display unit 120a and bent toward the second side.

The part 162a, 162b according to the embodiment of the present disclosure may be chip-on-film (COF) bent 162a or PolyImide (PI) bent 162b according to a bending and connection structure thereof.

The OLED layers 125a and 126a may make contact with the second polymer layer 127a, and may be arranged between the second polymer layer 127a and the first surface of the display unit 120a. The OLED layers 125a and 126a may include a polarization panel 125a and a display panel 126a. The polarization panel 125a is stacked on a lower surface of the optically clear adhesive film 124a, and may be provided to increase the screen quality of the display panel 126a, which will be described below, and to improve outdoor visibility.

According to various embodiments of the present disclosure, the OLED layers have been exemplified as the layers for displaying a screen, but the present disclosure is not limited thereto. For example, various modifications and changes such as LCD layers or LED layers may be made.

In this way, in the display unit 120a according to the present disclosure, the window panel 121a, the optically clear adhesive film 122a, the touch panel 123a, the optically clear adhesive film 124a, the OLED layers 125a and 126a, the second polymer layer 127a, and the first polymer layer 128a may be sequentially stacked between the first surface and the second surface of the display unit 120a.

The touch panel 123a and a separate second conductive pattern may be provided between the first polymer layer 128a and the second polymer layer 127a.

According to various embodiments of the present disclosure, the lower panel 120b is stacked on a the second surface of the display unit 120a to support the display unit 120a, and may be provided to prevent an internal module and the like from being viewed through the display unit 120a. A first opening 125b may be provided in the lower panel 120b such that an illumination intensity sensor member 130 may be positioned at a predetermined location of the active area AA of the display unit 120a.

The lower panel 120b may be a structure stacked on the second surface of the display unit 120a, and may include various panels. The lower panel 120b may include flexible layers 121b and 122b, and a NFC module.

The lower panel 120b may have a first adhesive layer to make contact with the second surface of the display unit 120a.

The flexible layers 121b and 122b according to the embodiment of the present disclosure may make contact with the first adhesive layer, and may be arranged between the first adhesive layer and the second surface of the housing 110.

According to various embodiments of the present disclosure, the flexible layers 121b and 122b may include an embossed panel 121b and a sponge panel 122b.

The embossed panel 121b may be formed of an opaque material, and may have a dark color such that an internal structure cannot be viewed through the display unit 120a. The embossed panel 121b may function to support the second polymer layer 127a together with the first polymer layer 128a mounted to support or reinforce the second polymer layer 127a.

According to various embodiments of the present disclosure, the sponge panel 122b may be provided to alleviate and/or eliminate a pressing phenomenon or a coming out phenomenon due to foreign substances that may occur during an assembly process of the display unit 120a.

According to various embodiments of the present disclosure, the NFC module 123b may be disposed between the flexible layers 121b and 122b and a part of the first circuit board 140. The NFC module 123b may include a wireless communication module and a conductive panel. The wireless communication circuit may perform wireless communication based on an NFC protocol. The NFC module 123b may be included when a NFC is supported through the front surface of the display unit 120a. The NFC module may be formed of ferrite, and the near field communication module of ferrite may improve the performance of antennas, and may prevent the material of the NFC module from influencing an internal circuit during communication and improve communication efficiency.

According to various embodiments of the present disclosure, the NFC module 123b may be arranged between the flexible layers 121b and 122b and a part of the first circuit board 140, and an adhesive layer such as a double-sided tape may be located between the embossed panel 122b or the first circuit board 140 and the NFC module 123b.

According to the embodiment of the present disclosure, the first circuit board 140 may be arranged on a bottom surface of the lower panel 120b. The first circuit board 140 may include a part arranged between the flexible layers 121b and 122b and the second surface of the housing 110. The first circuit board 140 includes another part extending from the part and bent towards the second side, which may be connected to the main circuit board.

The display unit 120a or the lower panel 120b described above should be electrically connected to the first circuit board 140. Accordingly, in the first embodiment of the present disclosure, two embodiments having different electrical connections may be described.

First, as illustrated in FIG. 5, the display unit 120a (e.g., the first polymer layer 127a) and the first circuit board 140 may be electrically connected to each other through COF bending.

Alternatively, as illustrated in FIG. 6A, 6B, the display unit 120a (e.g., the first polymer layer 127a) and the first circuit board 140 may be electrically connected to each other through PI bending.

According to various embodiments of the present disclosure, the lower panel 120b may have a first opening 125b such that the illumination intensity sensor member 130 may be provided at a predetermined location corresponding to the active area AA.

According to various embodiments of the present disclosure, differently from the display unit 120a, the lower panel 120b may be formed of an opaque material to restrict internal components of the display unit 120a from being viewed. Accordingly, an illumination intensity sensor unit may be arranged in the lower panel 120b, and may have the first opening 125b such that external incident light may be introduced into the illumination intensity sensor unit 131. In detail, because the display unit 120a according to various embodiments of the present disclosure is formed of a transparent material to display a screen generated in the display panel 126a, external incident light may be introduced to the first polymer layer 128a. The first opening 125b is formed in the lower panel 120b provided to prevent an internal structure form being viewed so that the illumination intensity sensor unit 131, which will be described below, may be mounted to correspond to the active area AA and external incident light may reach the illumination intensity sensor unit 131.

Figure 7:
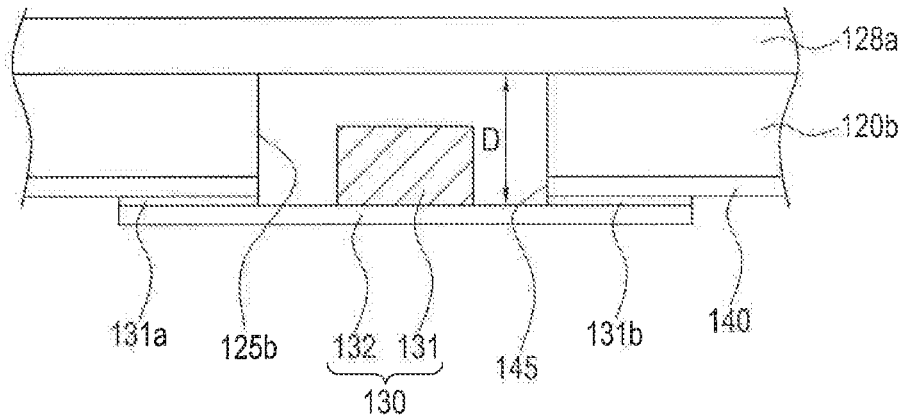
FIG. 7 is a partially sectional view of a lower panel to which an illumination intensity sensor member is mounted and a first circuit board according to a first embodiment of the present disclosure, in an electronic device according to various embodiments of the present disclosure.

FIG. 7 is a partially sectional view of a lower panel to which an illumination intensity sensor member is mounted and a first circuit board according to a first embodiment of the present disclosure, in an electronic device according to various embodiments of the present disclosure.

Figure 8:
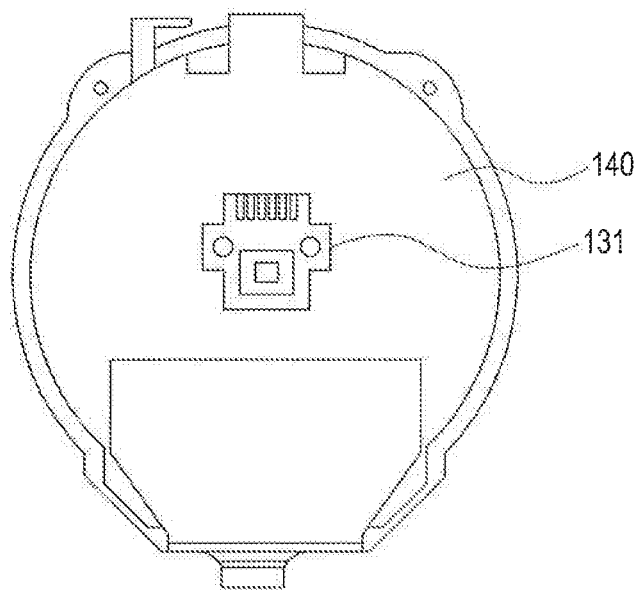
FIG. 8 is a plan view of a first circuit board to which an illumination intensity sensor member is mounted according to a first embodiment of the present disclosure, in an electronic device according to various embodiments of the present disclosure.

FIG. 8 is a plan view of a first circuit board to which an illumination intensity sensor member is mounted according to an embodiment of the present disclosure, in an electronic device according to various embodiments of the present disclosure.

Figure 9A:
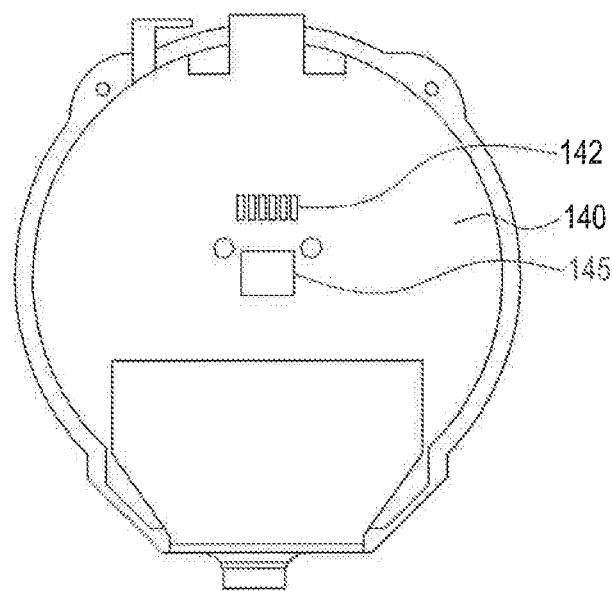
FIGS. 9A and 9B are views illustrating separated states of a first circuit board to which an illumination intensity sensor member is mounted according to a first embodiment of the present disclosure, in an electronic device according to various embodiments of the present disclosure.
Figure 9B:
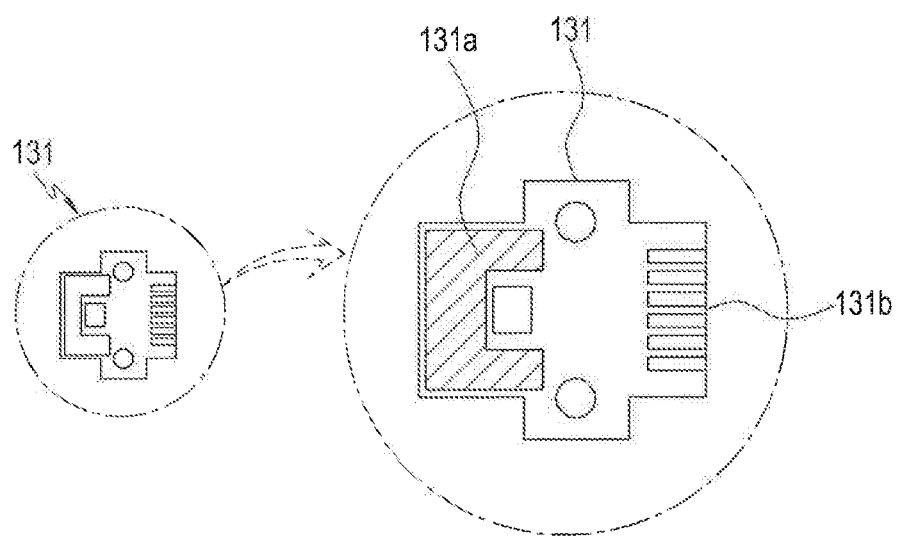

FIGS. 9A and 9B are views of separated states of a first circuit board to which another illumination intensity sensor member is mounted according to an embodiment of the present disclosure, in an electronic device according to various embodiments of the present disclosure.

Referring to FIGS. 7, 8, 9A and 9B, the first circuit board 140 is also called a display circuit board, and may include a flexible circuit board. The first circuit board 140 may be stacked on a bottom surface of the lower panel 120b. One end of the first circuit board 140 may be electrically connected to the display unit 120a through COF bending or PI bending, and an opposite end of the first circuit board 140 may further include another part extending from an end of the opposite end and being bent to be electrically connected to the main circuit board provided within the housing 110. The first circuit board 140 according to the embodiment of the present disclosure may include a second opening 145 corresponding to the first opening 125b and connected to the first opening 125b. As will be described below, if a support member (i.e., referred to as 'a second circuit board 132'), on which the illumination intensity sensor member 130, for example, the illumination intensity sensor unit 131 is mounted, is mounted on a bottom surface of the first circuit board 140 to correspond to a location of the second opening 145, the illumination intensity sensor unit 131 may be provided to be positioned in the second opening 145 and the first opening 125b connected to the second opening 145. The sizes of the first opening 125b and the second opening 145 may have a size corresponding to the angle of view of the illumination intensity sensor unit 131. The size of the opening according to the present disclosure, for example, a distance from a bottom surface on which the illumination intensity sensor unit 131 to an upper side of the first opening may be about 0.2 mm or more.

According to various embodiments of the present disclosure, a terminal unit 142 that may be electrically coupled to a connection terminal 131b provided in the illumination intensity sensor member 130, that is, the second circuit board 132, which will be described below, may be provided at a peripheral circumference of the second opening 145 of the first circuit board 140. The connection terminal 131b and the terminal unit 142 may be coupled to each other through a thermal fusion method (a hot bar method).

According to various embodiments of the present disclosure, as mentioned above, the illumination intensity sensor member 130 may be arranged at a predetermined location of the active area AA of the display unit 120a, and accordingly, may be mounted at the locations of the first and second openings 125b and 145 formed on the active area AA of the display unit 120a.

The illumination intensity sensor member 130 according to various embodiments of the present disclosure may include a second circuit board 132 and an illumination intensity sensor unit 131.

The second circuit board 132 is stacked on a bottom surface of the first circuit board 140, and may be provided to cover the second opening 145 to correspond to a location of the second opening 145. The second circuit board 132 may be electrically connected to the first circuit board 140 to transmit a signal of the illumination intensity sensor unit 131 to the first circuit board 140. The illumination intensity sensor unit 131, which will be described below, and a coupling member 131a and a connection terminal 131b may be provided on one surface of the second circuit board 132.

The illumination intensity sensor unit 131 may be electrically mounted on an upper portion of the second circuit substrate 132, and if the second circuit board 132 is stacked to be engaged with the second opening 145 of the first circuit board 140, the illumination intensity sensor unit 131 may be positioned inside the first and second openings. The illumination intensity sensor unit 131 may detect external incident light introduced through the first and second openings from the outside of the display unit 120a.

The coupling member 131a may be provided at a peripheral location of the illumination intensity sensor unit 131 such that the second circuit board 132 may be bonded to the first circuit board 140. The coupling member 131a may be a conductive double-sided tape, but also may be a non-conductive double-sided tape.

The connection terminal 131b is provided at a location different from a location of the coupling member 131a around the illumination intensity sensor unit 131, and is provided at a location corresponding to the terminal unit 142 of the first circuit board 140 to be electrically connected to the terminal unit 142 of the first circuit board 140 if the second circuit board 132 is coupled to the first circuit board 140. As mentioned above, the terminal unit 142 and the connection terminal 131b may be coupled to each other through thermal fusion.

It has been described as an example that the illumination intensity sensor member 130 according to various embodiments of the present disclosure is mounted on the first circuit board 140 having the second opening 145 to be connected to the first opening 125b while the illumination intensity sensor unit 131 is mounted on the second circuit board 132. Accordingly, the first circuit board 140 may additionally increase in strength as the second circuit board 132 is coupled to the first circuit board 140, and when the illumination intensity sensor member 130 is broken or damaged, the illumination intensity sensor member 130 may be easily replaced by separating only the second circuit board 132 from a bottom surface of the first circuit board 140, so that the maintenance thereof may be easily realized.

In the electronic device 100 having the above-described structure, the illumination intensity sensor member 130 may be arranged at a predetermined location of the active area AA of the display unit 120a, for example, a central portion of the active area AA (see FIG. 4). Although it has been described as an example that the illumination intensity sensor member 130 according to various embodiments of the present disclosure is mounted to be located at a central portion of the active area AA, the present disclosure is not limited thereto and it may be mounted at any location of the active area AA.

External incident light is introduced into the first and second openings after passing through the transparent window panel 121a, the touch panel 123a, and the display panel 126a, and may be introduced into the illumination intensity sensor unit 131 mounted to the inside of the first and second openings. The illumination intensity sensor unit 131 mounted in the active area AA of the display unit 120a may detect the introduced incident light, and may adjust the brightness of the display unit 120a according to the brightness of the outside through the detected value.

An electronic device 200 according to another embodiment of the present disclosure will be described.

In a description of the electronic device 200 according to a second embodiment of the present disclosure, the same configuration, structure, and operation described in the description of the electronic device 100 will not be repeated. The electronic device 200 according to the second embodiment of the present disclosure is different from the electronic device 100 according to the prior embodiment of the present disclosure in the structure of the illumination intensity sensor member and the mounting structure of the illumination intensity sensor member.

For example, although it has been described that the illumination intensity sensor member 130 according to the prior embodiment is configured such that the illumination intensity sensor unit 131 is mounted to the second circuit board 131, which is separate from the first circuit board 140, to be electrically connected to the first circuit board 140, the illumination intensity sensor unit 230 according to the present embodiment of the present disclosure is different from the illumination intensity sensor member 130 because it is directly mounted on the circuit board 240, and accordingly, the structure due to the illumination intensity sensor member 230 is different.

Figure 10:
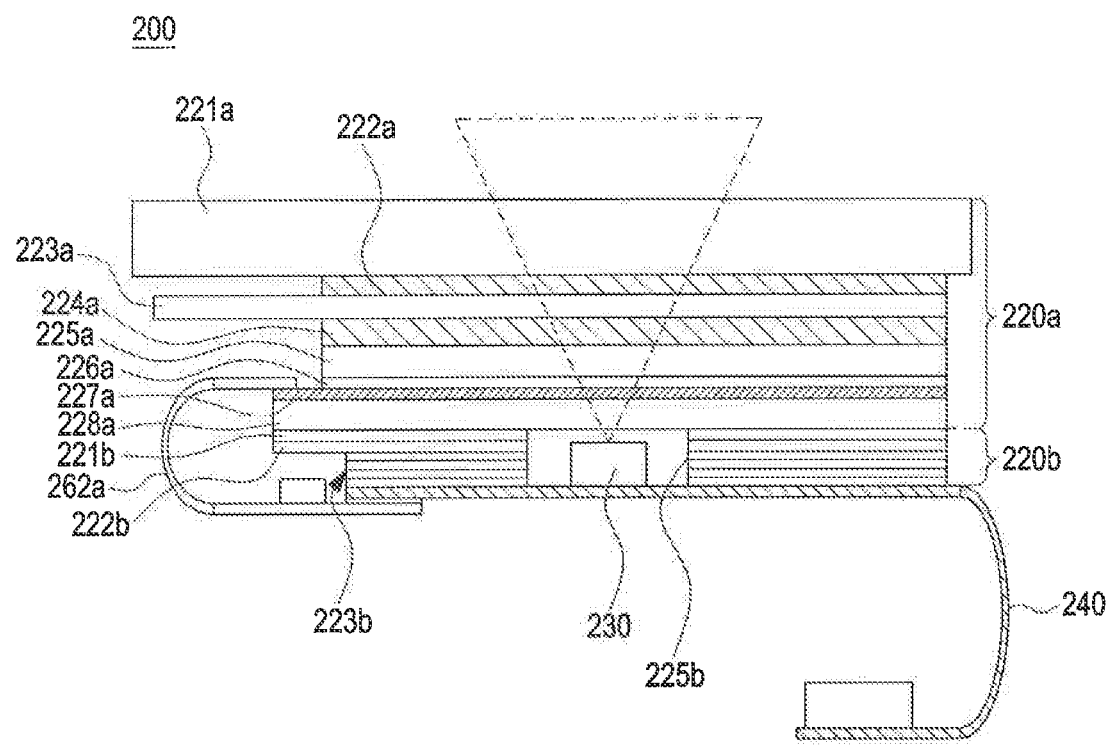
FIG. 10 is a view illustrating an electrical coupling state according to an embodiment of the present disclosure in addition to a stack state of an electronic device according to a second embodiment of the present disclosure in an electronic device according to various embodiments of the present disclosure.

FIG. 10 is a view illustrating an electrical coupling state according to an embodiment of the present disclosure in addition to a stack state of an electronic device according to an embodiment of the present disclosure, in the electronic device according to various embodiments of the present disclosure.

Figure 11:
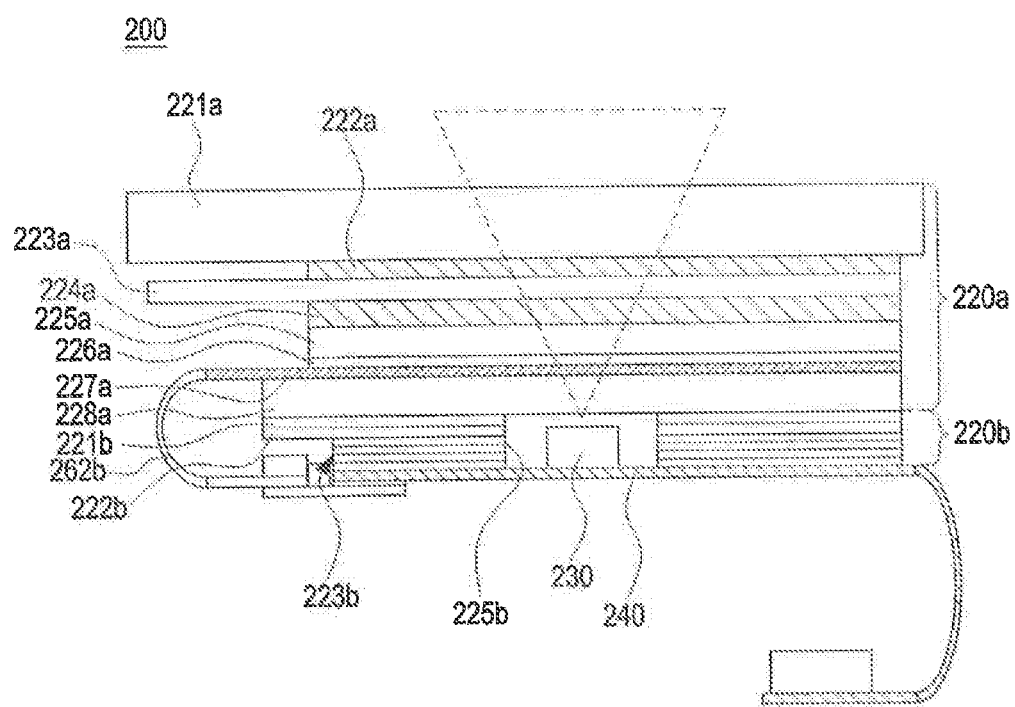
FIG. 11 is a view illustrating a stack state of an electronic device according to a second embodiment of the present disclosure and an electrical coupling state according to another embodiment of the present disclosure in an electronic device according to various embodiments of the present disclosure.

FIG. 11 is a view illustrating an electrical coupling state according to an embodiment of the present disclosure in addition to a stack state of an electronic device according to an embodiment of the present disclosure, in the electronic device according to various embodiments of the present disclosure.

Figure 12:
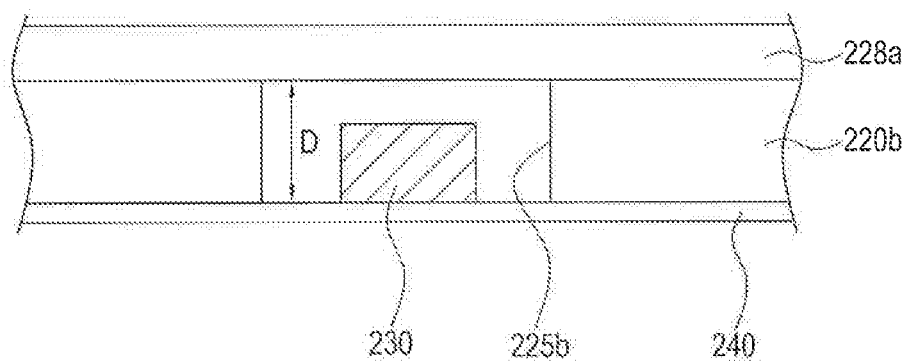
FIG. 12 is a partially sectional view of a lower panel to which an illumination intensity sensor member is mounted and a first circuit board according to a second embodiment of the present disclosure, in an electronic device according to various embodiments of the present disclosure.

FIG. 12 is a partially sectional view of a lower panel on which an illumination intensity sensor member is mounted according to an embodiment of the present disclosure and a circuit board, in an electronic device according to various embodiments of the present disclosure.

Referring to FIGS. 10 to 12, an electronic device 200 according to the embodiment of the present disclosure may also include the housing 110, a display unit 220a, and an illumination intensity sensor member 230, and the configuration of the housing 110 and the configurations of a display unit 220a and a lower panel 220b may not be repeated because they are similar to those of the prior embodiment of the present disclosure.

For example, the housing 110 may include a first surface (ex. upper surface) that faces a first side, a second surface (ex. bottom surface) that faces a second side opposite to the first side, and a side surface that surrounds at least a portion of a space between the first surface and the second surface.

The display unit 220a positioned on one surface of the housing 110, for example, the first surface, and various internal components may be mounted within the housing 110.

The display unit 220a according to various embodiments of the present disclosure may be exposed through the first surface of the housing 110.

According to various embodiments of the present disclosure, the display unit 220a may display a screen and implement an input. The display unit 220a according to the embodiment of the present disclosure may include a window panel 221a, bonding layers 222a and 224a such as optical transparent mounting films (i.e., referred to as 'optical transparent mounting films'), a second conductive pattern (i.e., referred to as 'a touch panel 223a') that may implement an input according to an approach or a contact, an OLED layer including a polarization panel 225a and a display panel 226a, and first and second polymer layers 228a and 227a.

The electronic device 200 according to the embodiment of the present disclosure may include a display unit 220a, a lower panel 220b, and a circuit board 240. The configurations of the housing 210, the display panel 220a, and the lower panel 220b according to the embodiment of the present disclosure are the same as those of the prior embodiment of the present disclosure, and accordingly, a description thereof will not be repeated. Meanwhile, the circuit board 240 may be referred to as a display circuit board 240, and is similar to the first circuit board 140 of the prior embodiment of the present disclosure but is different from the first circuit board 140 in an aspect of the presence of the second opening. A detailed description thereof will be described below.

In the embodiment of the present disclosure, the stack states of the display unit 220a of FIGS. 10 and 11 are the same, but are different in that an electrical connection structure for connecting the display unit 220a to the first circuit board 240 is achieved through COF bending 262a (see FIG. 10) or PI bending (see FIG. 11) 262b, which has been described above and will not be repeated.

The display unit 220a may be provided to display a screen and implement an input. The display unit 220a according to the embodiment of the present disclosure may include a window panel 221a, a touch panel 223a, and a display panel 226a, and a description thereof will not be repeated.

The lower unit 220b may be stacked on a bottom surface of the display unit 220a, on which a plurality of panels are stacked, to support the display unit 220a. The lower panel 220b may include an opening 225b on which the illumination intensity sensor member 230, which will be described below, may be positioned at a predetermined location of the active area AA.

The lower panel 220b according to the embodiment of the present disclosure may be a structure stacked on the second surface of the display unit 220a, and may include various panels. The lower panel 220b may include flexible layers 221b and 222b, and a NFC module 223b. The lower panel 220b may have a first adhesive layer to make contact with the second surface of the display unit 220a.

The flexible layers 221b and 222b according to the embodiment of the present disclosure may make contact with the first adhesive layer, and may be arranged between the first adhesive layer and the second surface of the housing 210.

A detailed description thereof will not be repeated.

A opening 225b may be formed in the lower panel 220b, for example, the second lower panel 222b at a predetermined location corresponding to the active area AA, and the illumination intensity sensor member 230 may be mounted on the lower panel 220b.

Differently from the display unit 220a, the lower panel 220b according to the embodiment of the present disclosure may be formed of an opaque material to restrict the internal components of the display unit 220a from being viewed from the outside. Accordingly, the illumination intensity sensor member 230 according to the present disclosure may be arranged in the lower panel 220b, and an opening 225b may be provided such that external incident light may be introduced into the illumination intensity sensor member 230.

In detail, because the display unit 220a according to various embodiments of the present disclosure is formed of a transparent material to display a screen generated in the display unit 220a, external incident light may be introduced to the display unit 220a and the first polymer layer 228a. The opening 225b is formed in the lower panel 220b provided to prevent an internal structure form being viewed so that the illumination intensity sensor member 230, which will be described below, may be mounted to correspond to the active area AA and external incident light may reach the illumination intensity sensor member 230. The distance between a bottom surface of the display unit 220a, on which the illumination intensity sensor member 230 is mounted, and an upper side of the opening 225b may be about 0.2 mm or more.

The circuit board 240 is also referred to as a display circuit board 240, and may be stacked on a bottom surface of the lower panel 220b. One end of the circuit board 240 may be electrically connected to the display unit 220a through COF bending or PI bending, and an opposite end thereof may be electrically connected to the main circuit board provided within the housing 210.

The illumination intensity sensor member 230 may be mounted on the circuit board 240 according to the embodiment of the present disclosure at a location where the illumination intensity sensor member 230 is connected to the opening 225b to correspond to the opening 225b. The size of the opening 225b may correspond to the size of the angle of view of the illumination intensity sensor member 230.

The illumination intensity sensor member 130 according to the prior embodiment of the present disclosure includes an illumination intensity sensor unit 131 and a second circuit board 132 and the illumination intensity sensor unit 131 is electrically connected to the first circuit board 140 while being mounted on the second circuit board 132, but the illumination intensity sensor member 230 according to the embodiment of the present disclosure includes only an illumination intensity sensor unit and the illumination intensity sensor unit may be directly mounted on the circuit board 240. Accordingly, although the circuit board 140 has a second opening 145 connected to the first opening 125b such that the illumination sensor unit is located in the opening 125b according to the prior embodiment of the present disclosure, a separate second opening is not formed in the circuit board 240 and an illumination intensity sensor member 230 may be mounted at a location corresponding to the location of the opening 225b according to the embodiment of the present disclosure.

The illumination intensity sensor member 230 according to the embodiment of the present disclosure may be arranged at a predetermined location of the active area AA of the display unit 220a on the circuit board 240, and accordingly, may be mounted at the location of the opening 225b formed on the active area AA of the display unit 220a. The illumination intensity sensor member 230 may detect external incident light introduced through the first and second openings from the outside of the display unit 220*a*.

FIGS. 13A and 13B are schematic views illustrating a driving process of an illumination intensity sensor, in an electronic device according to various embodiments of the present disclosure.

Referring to FIGS. 13A and 13B, external incident light may be filtered through an illumination intensity sensor filter of the illumination sensor unit. A photodiode of the illumination intensity sensor unit may convert filtering data into an electrical signal. The electrical signal of an analog level, which was varied by the photodiode, may be changed into an electrical signal of a digital level through an analog digital converter (ADC) converting block.

According to various embodiments of the present disclosure, when an interference is generated by light of the display unit while perfect external incident light introduced into the illumination intensity sensor unit is acquired, data of the display unit, such as an amount of incident light, may be switched off at a specific time and may be synchronized with a detection time of the illumination intensity sensor unit.

According to various embodiments of the present disclosure, an amount of actual external light may be detected through digital level data of the incident light varied through the illumination intensity sensor unit, and the brightness of the display unit may be automatically adjusted according to the detected value.

An illumination sensor member according to various embodiments of the present disclosure is located in a lower panel on a rear surface of a display unit to be arranged in an active area of the display unit, in which case an error may be generated due to light emission of the display unit in a low illumination intensity environment. Accordingly, signals may be transmitted from and received by a display driver IC (DDI), and when pixel information of the DDI may be analyzed, external illumination intensity may be determined by subtracting error data generated when the display unit emits light through information received from the DDI (e.g., illumination intensity or color) from information of incident light acquired from the illumination intensity sensor unit and then may be transferred to the display unit. That is, an actual brightness of the display may be calibrated by reflecting light generated by the display of the electronic device.

According to various embodiments of the present disclosure, not only an illumination sensor but also an image sensor or a fingerprint sensor may be disposed on a lower part of a rear surface of a display device, and an image corresponding to user's biometric information (e.g., fingerprint) may be acquired through the image sensor or fingerprint sensor. Further, an image acquired through the image sensor or fingerprint sensor may enable a correction, which reflects data of light-emitting of the display device, through information (e.g., brightness, color, etc.) provided by a Display Driver IC (DDI).

Further, a watch type wearable electronic device is illustrated as an example of an electronic device according to various embodiments of the present disclosure. However, the present disclosure is not limited to the watch type wearable electronic device and may include an electronic device having a display device, such as a terminal device like a bar type portable terminal, the shape, structure, or configuration of which can be changed or modified as long as the electronic device includes a display and a sensor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a front cover forming at least part of a front surface of the electronic device;
   a rear cover forming at least part of a rear surface of the electronic device;
   a display disposed between the front cover and the rear cover;
   a lower panel disposed between the display and the rear cover, the lower panel including a first opening formed through the lower panel;
   a circuit board disposed between the lower panel and the rear cover, the circuit board including a second opening formed through the circuit board and aligned with the first opening; and
   a sensor configured to detect at least a portion of light received via the display and from an outside of the electronic device,
   wherein at least a portion of the sensor is positioned inside the second opening.

2. The electronic device of claim 1, wherein the display comprises:
   a first polymer layer forming at least part of a surface of the display facing the lower panel;
   a second polymer layer disposed over the first polymer layer;
   an organic light-emitting diode (OLED) layer disposed over the second polymer layer; and
   a conductive pattern disposed over the OLED layer.

3. The electronic device of claim 2, wherein the second polymer layer includes:
   a flat portion positioned at least partially overlapped with the first polymer layer; and
   a bending portion extended from an edge of the flat portion and bent toward the circuit board.

4. The electronic device of claim 3, wherein the second polymer layer is electrically coupled with the circuit board via the bending portion.

5. The electronic device of claim 1, wherein the circuit board includes a bending portion bent toward the rear cover.

6. The electronic device of claim 5, further comprising:
   a connector mounted at an end of the bending portion of the circuit board, and
   wherein the circuit board is electrically coupled with another circuit board via the connector.

7. The electronic device of claim 1, wherein the display and the sensor are spaced apart from each other by a specified distance such that an air gap is formed between the display and the sensor.

8. The electronic device of claim 1, wherein the sensor is in contact with another circuit board and electrically connected with the circuit board via the other circuit board.

9. The electronic device of claim 8, further comprising:
   a connector mounted on the other circuit board, and
   wherein the sensor is electrically connected with the circuit board via the connector.

10. The electronic device of claim 1,
    wherein the display comprises an active area in which a screen is displayed and a non-active area surrounding at least part of the active area, and wherein the first opening and the second opening are formed below the active area.

11. An electronic device comprising:
a display;
a supporting member disposed below the display and configured to support at least part of the display, the supporting member including a first opening formed through the supporting member;
a circuit board disposed below the supporting member, the circuit board including a second opening formed through the circuit board and aligned with the first opening; and
a sensor disposed below the first opening and configured to detect at least a portion of light received from an outside of a housing through at least part of a space formed from the first opening and the second opening,
wherein at least a portion of the sensor is positioned inside the second opening.

12. The electronic device of claim 11, wherein the display includes:
a first polymer layer forming at least part of a surface of the display facing the supporting member; and
a second polymer layer disposed over the first polymer layer, and
wherein the second polymer layer includes a flat portion positioned at least partially overlapped with the first polymer layer and a bending portion extended from an edge of the flat portion.

13. The electronic device of claim 12, wherein the bending portion is bent toward the circuit board and the second polymer layer is electrically coupled with to the circuit board via the bending portion.

14. The electronic device of claim 11, further comprising:
a connector mounted at a bending portion of the circuit board, and
wherein the circuit board is electrically coupled with another circuit board via the connector.

15. The electronic device of claim 11, wherein the display and the sensor are spaced apart from each other by a specified distance such that an air gap is formed between the display and the sensor.

16. The electronic device of claim 11, wherein the sensor is in contact with another circuit board and electrically connected with the circuit board via the other circuit board.

17. The electronic device of claim 16, wherein the sensor is electrically connected with the circuit board via a connection member.

18. An electronic device comprising:
a display including an active area and a non-active area surrounding at least part of the active area;
a lower panel disposed below the display, and including a first opening formed in a portion of the lower panel corresponding to the active area;
a circuit board disposed below the lower panel, and including a second opening formed through the circuit board and aligned with the first opening; and
a sensor configured to acquire an image corresponding to biometric information, at least a portion of the sensor positioned inside the second opening.

19. The electronic device of claim 18,
wherein the display includes a polymer layer, and
wherein the polymer layer includes a flat portion positioned at least partially overlapped with the lower pane and a bending portion extended from an edge of the flat portion and bent toward the circuit board, and the display is electrically coupled with the circuit board via the bending portion.

20. The electronic device of claim 18, wherein the display and the sensor are spaced apart from each other by a specified distance such that an air gap is formed between the display and the sensor.

* * * * *